(12) United States Patent
Uselton

(10) Patent No.: US 12,031,945 B1
(45) Date of Patent: Jul. 9, 2024

(54) APPARATUS, SYSTEMS, AND METHODS FOR INSPECTING TUBULARS OF DIFFERENT SIZES

(71) Applicant: SCAN SYSTEMS, CORP, The Woodlands, TX (US)

(72) Inventor: Danny Uselton, Spring, TX (US)

(73) Assignee: SCAN SYSTEMS CORP., The Woodlands, TX (US)

( * ) Notice: Subject to any disclaimer, the term of this patent is extended or adjusted under 35 U.S.C. 154(b) by 707 days.

(21) Appl. No.: 16/987,211

(22) Filed: Aug. 6, 2020

Related U.S. Application Data

(60) Provisional application No. 62/889,365, filed on Aug. 20, 2019.

(51) Int. Cl.
*G01N 27/90* (2021.01)

(52) U.S. Cl.
CPC .................................. *G01N 27/90* (2013.01)

(58) Field of Classification Search
CPC ...................................................... G01N 27/90
See application file for complete search history.

(56) References Cited

U.S. PATENT DOCUMENTS

| | | |
|---|---|---|
| 2,563,254 A | 8/1951 | Lewis |
| 2,886,772 A | 5/1959 | Gresham |
| 3,437,917 A | 4/1969 | Gunkel et al. |
| 3,539,915 A | 11/1970 | Walters et al. |
| 3,612,987 A | 10/1971 | Placke |
| 3,710,236 A | 1/1973 | Halsey et al. |
| 3,958,049 A | 5/1976 | Payne |
| 4,058,762 A | 11/1977 | Holt et al. |
| 4,092,881 A | 6/1978 | Jurgens |
| 4,217,548 A | 8/1980 | Furukawa et al. |

(Continued)

FOREIGN PATENT DOCUMENTS

| | | |
|---|---|---|
| DE | 3729743 A1 | 3/1989 |
| JP | S61277051 A | 12/1986 |

(Continued)

OTHER PUBLICATIONS

USPTO, Notice of Allowance dated May 13, 2022, U.S. Appl. No. 16/987,232, filed Aug. 6, 2020.

(Continued)

*Primary Examiner* — Minh Q Phan
(74) *Attorney, Agent, or Firm* — Jeffrey L. Wendt; THE WENDT FIRM, P.C.

(57) ABSTRACT

Tubular member inspection apparatus, systems and methods for inspecting tubulars of a variety of diameters. One apparatus includes a frame, at least one magnetic flux generator contained in a coil annulus, and a detector assembly supported by the coil annulus. The coil annulus and the detector assembly each have inlet and outlet openings for passing a tubular member there through. The detector assembly has one or more magnetic detectors (magnetic, eddy current, or both) configured to be spaced a first distance from the tubular member during an inspection. The one or more magnetic detectors are each contained in one or more detector shoes removably attached to corresponding one or more detector shoe supports by one or more quick-acting couplings. Another apparatus includes an adjustable iris.

14 Claims, 10 Drawing Sheets

(56) References Cited

U.S. PATENT DOCUMENTS

| | | |
|---|---|---|
| 4,218,651 A | 8/1980 | Ivy |
| 4,378,072 A | 3/1983 | Appleman et al. |
| 4,503,393 A | 3/1985 | Moyer et al. |
| 4,510,447 A | 4/1985 | Moyer |
| 4,534,405 A | 8/1985 | Hulek |
| 4,543,528 A | 9/1985 | Baraona |
| 4,602,212 A | 7/1986 | Hiroshima et al. |
| 4,629,991 A | 12/1986 | Wheeler |
| 4,675,604 A | 6/1987 | Moyer |
| 4,739,273 A | 4/1988 | Peterson et al. |
| 4,912,410 A | 3/1990 | Morley |
| 4,916,394 A | 4/1990 | Thompson |
| 5,007,291 A | 4/1991 | Walters et al. |
| 5,030,911 A | 7/1991 | Lam |
| 5,142,230 A | 8/1992 | Nottingham |
| 5,157,977 A | 10/1992 | Grubbs |
| 5,446,382 A | 8/1995 | Flora |
| 5,671,155 A | 9/1997 | Edens et al. |
| 5,907,100 A * | 5/1999 | Cook ................. G01N 29/2412 73/622 |
| 5,914,596 A | 6/1999 | Weinbaum |
| 5,943,632 A | 8/1999 | Edens et al. |
| 6,316,937 B1 | 11/2001 | Edens |
| 6,580,268 B2 | 6/2003 | Wolodko |
| 6,745,136 B2 | 6/2004 | Lam et al. |
| 6,912,097 B2 | 6/2005 | Woods |
| 6,924,640 B2 | 8/2005 | Fickert et al. |
| 7,038,445 B2 | 5/2006 | Walters et al. |
| 7,107,154 B2 | 9/2006 | Ward |
| 7,337,673 B2 | 3/2008 | Kennedy et al. |
| 7,346,455 B2 | 3/2008 | Ward et al. |
| 7,397,238 B2 | 7/2008 | Walters et al. |
| 7,560,920 B1 | 7/2009 | Ouyang et al. |
| 7,622,917 B2 | 11/2009 | Walters et al. |
| 7,640,811 B2 | 1/2010 | Kennedy et al. |
| 7,795,864 B2 | 9/2010 | Barolak et al. |
| 8,020,460 B1 | 9/2011 | Hoyt |
| 8,264,221 B2 | 9/2012 | Faucher et al. |
| 10,082,485 B2 | 9/2018 | Uhlig et al. |
| 10,767,470 B2 | 9/2020 | Fouda et al. |
| 11,307,173 B1 | 4/2022 | Uselton et al. |
| 2006/0164091 A1 | 7/2006 | Nestleroth |
| 2007/0024278 A1 | 2/2007 | Walters et al. |
| 2007/0222438 A1* | 9/2007 | Reeves ................. G01N 27/82 324/228 |
| 2011/0167914 A1 | 7/2011 | Sutherland |
| 2012/0223037 A1* | 9/2012 | Witschen ............... A61B 50/33 211/85.13 |
| 2018/0196005 A1 | 7/2018 | Fanini et al. |
| 2020/0040674 A1 | 2/2020 | McKenzie |

FOREIGN PATENT DOCUMENTS

| | | |
|---|---|---|
| JP | S63221239 A | 9/1988 |
| JP | S6447944 A | 2/1989 |
| JP | H01110251 | 4/1989 |
| JP | H01232254 A | 9/1989 |
| JP | H02253152 A | 10/1990 |
| JP | H06148139 A | 5/1994 |
| JP | 2000081419 A | 3/2000 |
| JP | 2014044087 A | 3/2014 |
| RU | 36485 U1 | 3/2004 |

OTHER PUBLICATIONS

Yang, et al., "Inspection and Identification of Inner-Outer Defects on Oil-gas Pipeline", 17$^{th}$ World of. on Nondestructive Testing, Oct. 25-28, 2008, Shanghai, China, Chinese Society for Nondestructive Testing, Shanghai, China, downloaded from the Internet May 4, 2022, url: https://www.ndt.net/search/docs.php3?id=6673&file=article/wcndt2008/papers/487.pdf.

USPTO, Notice of Allowance dated Feb. 18, 2020, U.S. Appl. No. 16/987,195, filed Aug. 6, 2020, published as U.S. Pat. No. 11,307,173 B1, Apr. 19, 2022.

USPTO, Non-Final Office Action dated Feb. 1, 2022, U.S. Appl. No. 16/987,221, filed Aug. 6, 2020.

USPTO, Notice of Allowance dated May 6, 2022, U.S. Appl. No. 16/987,221, filed Aug. 6, 2020.

USPTO, Non-Final Office Action dated Feb. 1, 2022, U.S. Appl. No. 16/987,232, filed Aug. 6, 2020.

AN9003—A User's Guide to Intrinsic Safety, retrieved from the Internet Jul. 12, 2017.

Buckley, J.M., "An introduction to Eddy Current Testing theory and technology", pp. 1-7, Dec. 29, 1998, place of publication unknown, retrieved from the Internet Jun. 13, 2019.

Walters et al., "Using Magnetic Flux Density to Identify Anomalies In Pipe Wall Thickness", pp. 1-21, Dec. 23, 2005, place of publication unknown, retrieved from the Internet Nov. 19, 2012.

Staff report, Hydraulics & Pneumatics, "Fundamentals of quick-acting couplings", pp. 1-12, Jan. 1, 2012, place of publication unknown, retrieved from the Internet May 14, 2019.

Harco Metal Products Inc., "Telescoping Tube", 1 page, 2013, place of publication unknown, retrieved from the Internet May 13, 2019.

Stanley, R. K., "Electromagnetic Inspection of Carbon Steel Tubes", pp. 1-10, 1998, ASME NDE Group Conference, San Antonio, TX, published by NDE Information Consultants, Houston, Texas.

Jain, N., "The Rebirth of Eddy Current Nondestructive Testing", Quality Magazine, pp. 1-5, Aug. 11, 2014.

Niese et al., "Wall Thickness Measurement Sensor for Pipeline Inspection using EMAT Technology in Combination with Pulsed Eddy Current and MFL", ECNDT 2006—Tu.3.1.5, pp. 1-10, published by ECNDT (2006).

* cited by examiner

800 ↘

802
A method of EMI inspecting tubular members having different OD comprising:

804
(a) passing a first tubular member having a first OD through an EMI inspection apparatus or, driving the EMI inspection apparatus past the first tubular member and detecting variations in the magnetic field produced by defects in the first tubular member, the EMI inspection apparatus comprising:
  (i) a frame (2);
  (ii) at least one magnetic flux generator (4) contained in a coil annulus (8) and a detector assembly (6) supported by an iris, the iris comprising an annular base (40), an annular rotatable element (42), and a plurality of leaves (46), the annular base (40) supported by the coil annulus (8) via one or more support brackets (44);
  (iii) the coil annulus (8), the detector assembly (6), and the iris each having inlet and outlet openings (10, 12) for passing a tubular member (14) there through, the detector assembly (6) having one or more magnetic detectors (16) (magnetic, eddy current, or both) configured to be spaced a first distance from the tubular member (14) (preferably using one or more substantially frictionless members) during and inspection; and
  (iv) the one or more magnetic detectors (16) each contained in one or more detector shoes (18) removably attached to one more iris leaves (46) by shoe brackets (68);

806
(b) adjusting the iris to accomodate a second tubular member having a second OD different from the first OD to form a modified apparatus, and

808
(c) passing the second tubular member having the second OD through the modified apparatus, or driving the modified apparatus past the second tubular member and detecting variations in the magnetic field produced by defects in the second tubular member.

FIG. 8

APPARATUS, SYSTEMS, AND METHODS FOR INSPECTING TUBULARS OF DIFFERENT SIZES

CROSS-REFERENCE TO RELATED APPLICATIONS

This application is entitled to and claims the benefit of earlier filed provisional application No. 62/889,365, filed Aug. 20, 2019, under 35 U.S.C. § 119(e), which earlier filed provisional application is incorporated by reference herein in its entirety.

BACKGROUND INFORMATION

Technical Field

The present disclosure relates to apparatus, systems, and methods useful for testing the quality of tubular goods (hollow or solid), particularly automated inspection of tubular goods (sometimes referred to in the oil & gas industry as "oil country tubular goods", and herein sometimes as simply "OCTG").

Background Art

As noted in assignee's previous U.S. Pat. Nos. 7,397,238 and 7,622,917, electromagnetic inspection (EMI) of metal pipe or solid metal tubular members by magnetic means conventionally involves magnetizing the member to create a magnetic field which extends circumferentially and is characterized by lines of magnetic flux which extend either axially of the tubular member or generally perpendicular to its axis, dependent on the manner by which magnetism is induced. In many of the present systems, current flow through a wire coil positioned about the tubular member forms magnetic lines of flux through the opening of the coil which extend axially of the member under inspection. In other systems, current flows axially of the tubular member within the wall thereof so as to create a magnetic field, the lines of flux of which extend circumferentially about the tubular member in an orientation substantially perpendicular to the tubular member. The presence of structural flaws or anomalies in the wall of the tubular member, such as surface nicks or pits, cracks, voids, or various crystalline discontinuities, disturbs the uniformity of a magnetic field in the wall of the tubular member. Accordingly, the structural integrity of the tubular member and its relative freedom of such flaws may be inspected by sensing and detecting the magnetic field variations with sensors disposed closely adjacent the surface of the tubular member.

The sensing of variations in a magnetic field in a pipe wall is customarily achieved by passing or moving an induction coil or similar device through the magnetic field and any magnetic field variations to induce voltages in the coil indicative of the magnetic field variations. The voltages or voltage signals may then be transmitted to appropriate recording and processing equipment. For optimum detection sensitivity and for detection of very small cracks in a pipe wall which can be a few thousandths of an inch in depth, it is necessary that the detecting or sensor coil be placed closely adjacent the exterior surface of the tubular member. Normally the adjacent coil is disposed from 0.002 inches (0.051 mm) to 0.020 inches (0.51 mm) relative to the surface of the tubular member with an axis of the coil substantially perpendicular to the surface. The sensor coils are mounted in a support, conventionally referred to as a sensor shoe, which is provided with contact surfaces adapted to contact with the surface of the tubular member in a manner so that the sensing coil is supported closely adjacent the surface of the tubular member at an optimum distance or spacing. Normally, the coil is protected from direct contact with the surface of the pipe by means of a thin shim of magnetically transparent material.

Inspecting the surface of the tubular members requires that the inspection sensor be moved along the surface in a predetermined inspection path. In one widely used pipe inspection apparatus, a plurality of sensor shoes are applied to the surface of the pipe in circumferential spacing thereabout and each of the sensor shoes is moved relatively to the pipe in a circumferential helical path whereby the plurality of sensors provides more than 100 percent coverage of the pipe surface. The relative movement may be affected by moving the sensors longitudinally while rotating the sensor shoes around a stationary pipe or the pipe can be moved longitudinally while the sensors are rotated about the pipe. In any event, there is relative sliding movement between the sensor shoes and the pipe surface, which causes wear of the contact surfaces of a sensor shoe by extensive use. The shim also can come into contact with the pipe and can be similarly eroded. The wearing down of the contact surfaces and shim results in the coils being supported from the pipe surface inside the optimum spacing range or possibly being damaged by eventual contact with the pipe. When either event occurs, a new sensor shoe is required.

Furthermore, sensor shoes are customarily designed for use with a specific diameter of pipe, and the contact surfaces of a sensor shoe are fixed in a permanent orientation such that when placed in contact with the surface of the pipe, the sensing coil is positioned for optimum detection sensitivity. Accordingly, a given sensor shoe is designed for inspection of only one diameter of pipe and is inappropriate for use as an inspection sensor for pipes of a different diameter since for such pipe diameters the sensing coil is supported at other than an optimum distance from the surface to be inspected. U.S. Pat. No. 4,602,212 describes sensors holders (housing therein magnetic field detectors) that are mounted radially movably through a link mechanism providing a leaf spring to push the sensor holders radially inwardly. However, these leaf springs simply provide an action urging the sensors against the member being inspected; there is no provision for accommodating inspection of larger or smaller diameter tubulars with the same arrangement of sensors.

One goal of OCTG producers is high tonnage production per day or other time period, and any process or sub-process that slows down the manufacturing of OCTG or other tubulars is disadvantageous economically. In short, the more tons of pipe out the door the better. From the above it is evident that there is a need in the art for improvements in tubular member inspection methods and apparatus, particularly for those that can inspect multiple diameters of tubulars without great loss of time in changing the sensor shoes to accommodate the different diameter tubulars. The apparatus, systems, and methods of the present disclosure are directed to these needs.

SUMMARY

In accordance with the present disclosure, apparatus and systems for inspecting OCTG and other tubulars are presented, and methods of using same to inspect OCTG and other tubulars are described which reduce or overcome many of the faults of previously known apparatus, systems, and methods.

A first aspect of the disclosure is a tubular member EMI inspection apparatus comprising:

(a) a frame (2);

(b) at least one magnetic flux generator (4) contained in a coil annulus (8) and a detector assembly (6) supported by the coil annulus (8);

(c) the coil annulus (8) and the detector assembly (6) each having inlet and outlet openings (10, 12) for passing a tubular member (14) there through, the detector assembly (6) having one or more magnetic detectors (16) (magnetic, eddy current, or both) configured to be spaced a first distance from the tubular member (14) (in certain embodiments using one or more substantially frictionless members) during an inspection; and (d) the one or more magnetic detectors (16) each contained in one or more detector shoes (18) removably attached to corresponding one or more detector shoe supports (20) by one or more quick-acting couplings (22).

In certain embodiments the one or more quick-acting couplings may be selected from the group consisting of ball-lock couplings, roller-lock couplings, pin-lock couplings, flat-faced couplings, bayonet couplings, ring-lock couplings, cam-lock couplings, multi-tube connectors, and combinations thereof. In certain embodiments the one or more detector shoe supports may each comprise a telescoping member and locking mechanism to lock the telescoping members at a variety of lengths corresponding to diameter of the tubular to be EMI inspected. In certain other embodiments the one or more detector shoe supports may each comprise a non-telescoping member of length selected corresponding to diameter of the tubular to be EMI inspected, each non-telescoping member removably attached to an inner surface of the coil annulus by one or more quick-acting couplings.

In certain embodiments the tubular member may be hollow; in other embodiments the tubular member may be solid. In certain embodiments the EMI inspection apparatus frame may comprises a steel welded sub-frame supporting one or more pinch roller systems, and the coil annulus may comprise rigid aluminum. IN certain embodiments the apparatus may be configured to perform a quality EMI inspection of OCTG pipe with wall thicknesses up to about 0.625 inch (about 15.9 millimeters, or mm), and with production speeds up to about 150 feet per minute (about 46 meters per minute). In certain embodiments the EMI inspection apparatus may be configured to operate continuously, such as assignee's inspection apparatus known under the trade designation M-Series inspection units, originally created for steel mill applications and designed for 24/7 operation with low maintenance, and high production. In certain embodiments the EMI inspection apparatus may be configured to inspect plain-end OCTG materials having an outer diameter ranging from about 2⅜ inches (60.3 mm) to about 8.00 inches (203.2 mm). In certain embodiments the EMI inspection apparatus may be configured to inspect plain-end OCTG materials having an outer diameter ranging from about 4½ inches (114.3 mm) to about 14.00 inches (355.6 mm).

Certain embodiments may be configured to perform EMI inspection methods including magnetic flux leakage technology for OD and ID longitudinal and transverse flaws, magnetic flux density for 100% coverage of the wall thickness variations, and an eddy current system for comparison of metallurgical mass and permeability differences. In certain embodiments the detector assembly may comprise one or more EMAT sensors. In certain embodiments the first distance may be at least 0.030 inch (about 0.08 mm); in certain other embodiments the first distance may range from about 0.050 inch (about 1.27 mm) up to about 0.5 inch (about 12.7 mm). In certain embodiments the detector assembly may comprises a plurality of detector support sub-assemblies. Certain embodiments may comprise one or more actuators selected from the group consisting of pneumatic, hydraulic, and electronic actuators, and combination thereof, for example, to actuate telescoping members, to actuate an iris, and the like.

A second aspect of the disclosure is a tubular member EMI inspection apparatus comprising:

(a) a frame (2);

(b) at least one magnetic flux generator (4) contained in a coil annulus (8) and a detector assembly (6) supported by an iris, the iris comprising an annular base (40), an annular rotatable element (42), and a plurality of leaves (46), the annular base (40) supported by the coil annulus (8) via one or more support brackets (44);

(c) the coil annulus (8), the detector assembly (6), and the iris each having inlet and outlet openings (10, 12) for passing a tubular member (14) there through, the detector assembly (6) having one or more magnetic detectors (16) (magnetic, eddy current, or both) configured to be spaced a first distance from the tubular member (14) (preferably using one or more substantially frictionless members) during an inspection; and (d) the one or more magnetic detectors (16) each contained in one or more detector shoes (18) removably attached to one or more iris leaves (46) by shoe brackets (68).

In certain embodiments various components (for example, but not limited to the magnetic flux generator, detectors, telescoping supports, and iris) may be operated remotely via wired or wireless communication, and/or locally via on-board batteries, an on-board motor, and one or more programmable logic controllers (PLCs). Certain embodiments may comprise a software module including one or more algorithms for calculating or presenting parameters selected from the group consisting of longest substantially longitudinal flaw, deepest substantially longitudinal flaw, longest substantially transverse flaw, deepest substantially transverse flaw, minimum and maximum wall thickness, and combinations thereof.

Certain embodiments may further comprise a tubular conveyor sub-system on which the tubulars traverse before and after being inspected at the inspection sub-assembly.

Certain embodiments may further comprise one or more actuators (in certain embodiments, one or more robots) adapted to pick up the tubular being inspected and insert the tubular into the inspection sub-assembly, the one or more actuators selected from the group consisting of pneumatic, hydraulic, and electronic actuators, and combination thereof.

Methods for inspecting OCTG and other tubulars are further aspects of the disclosure and described herein.

These and other features of the apparatus, systems, and methods of the disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain apparatus, systems, and methods in accordance with the present disclosure may comprise a number of physical components and features, but may be devoid of certain optional hardware and/or other features.

BRIEF DESCRIPTION OF THE DRAWINGS

The manner in which the objectives of this disclosure and other desirable characteristics can be obtained is explained in the following description and attached drawings in which:

FIGS. 5, 6, 7, and 8 are logic diagrams of four methods of inspecting pipe or other OCTG in accordance with the present disclosure.

It is to be noted, however, that the appended drawings of FIGS. 1, 2, 3, 3A-C, and 4A-H may not be to scale and illustrate only typical apparatus and system embodiments of this disclosure. Furthermore, FIGS. 5-8 illustrate only four of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

Figure 1:
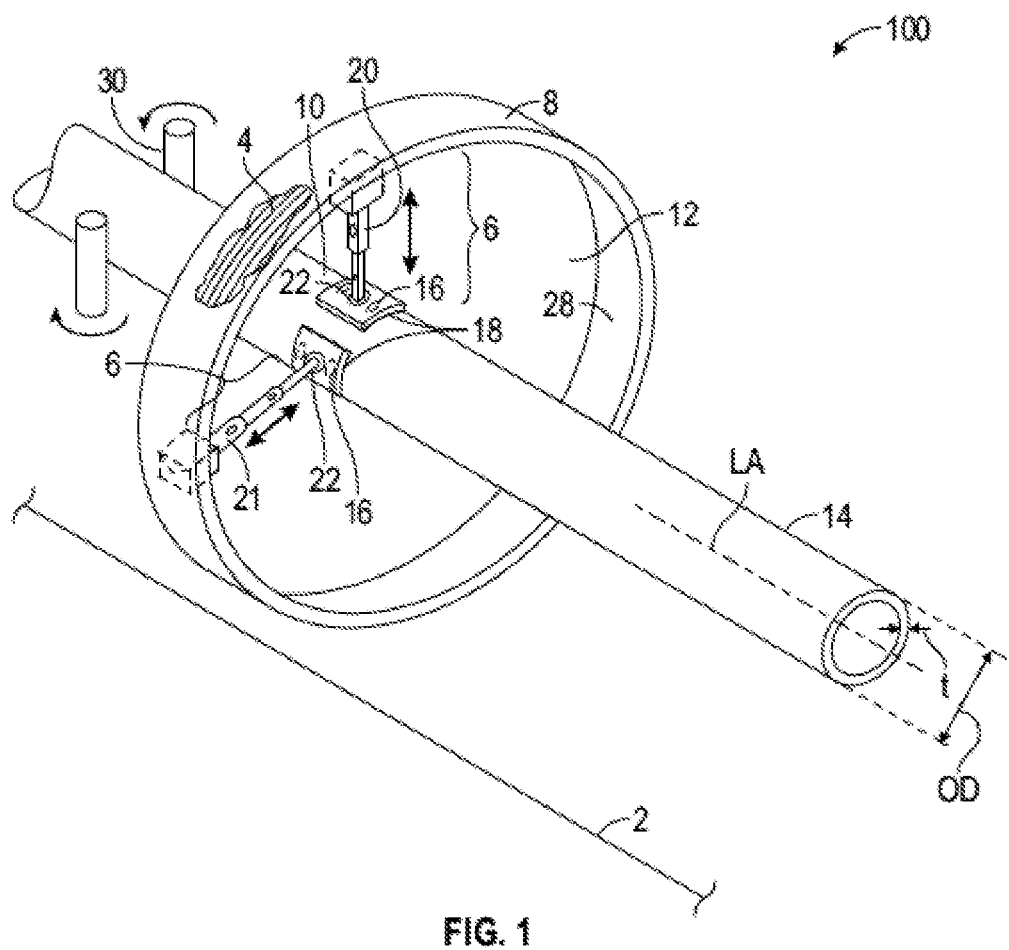
FIGS. 1, 2, and 3 are schematic perspective views of three apparatus and system embodiment of the present disclosure.

In the following description, numerous details are set forth to provide an understanding of the disclosed apparatus, combinations, and methods. However, it will be understood by those skilled in the art that the apparatus, systems, and methods disclosed herein may be practiced without these details and that numerous variations or modifications from the described embodiments may be possible. All U.S. published patent applications and U.S. patents referenced herein are hereby explicitly incorporated herein by reference, irrespective of the page, paragraph, or section in which they are referenced. Where a range of values describes a parameter, all sub-ranges, point values and endpoints within that range are explicitly disclosed herein.

The present disclosure describes apparatus, systems, and methods for inspection of OCTG or other tubular or pipe. As mentioned herein, OCTG means any tubular used in the oil & gas industry, including solid tubulars such as rod pump rods, including but not limited to, drill pipe, line pipe, casing, coiled tubing, and the like, including those that have been through none, all or a combination of any one or more of the common mechanical, thermal, chemical OCTG treatment methods.

The apparatus may comprise a single or multiple detectors (sometimes referred to herein as "detector elements", "instruments", "detectors", or "detector elements") using magnetic flux leakage principles, eddy current, electromagnetic acoustic (EMA), or any combinations of these, to inspect OCTG for the presence of flaws. The detector(s) may be mounted on the apparatus through a variety of ways depending on the detector being installed, positions available in the apparatus, and the accuracy of flaw detection required. Software either intrinsic to the detector, or installed elsewhere in the apparatus, or installed remotely on a computer type device, converts the measurements into usable calculated information. The usable calculated information may be displayed locally at the device and/or remotely on a computer type device. Digital signal processing software, known under the trade designation Digi-Pro™, available from Scan Systems Corp, Houston, Tex., allows 100 percent of the inspection signal to be digitized and processed within a computer. The computer and digital signal processing software known under the trade designation Digi-Pro™ may utilize a series of virtual printed circuit boards known under the trade designation SimKardz™ to perform the calculations required. Signals may be captured from the detectors and digitized almost immediately, then processed through one or more algorithms to produce large signal to noise ratios. Improvements in signal to noise ratios of at least 20 percent, sometimes at least 100 percent, and in certain embodiments even 200 percent have been seen, compared with existing industry standard equipment. Hall Element devices may be used to sense the electrical shift in voltage during the inspection methods of the invention; however, there could be any number of different sensing technologies that could be used, eddy current being one of the other preferred sensing technologies.

In certain embodiments, the magnetic field fluctuation detectors are hall units. Other similar devices may be utilized with the method, selected from magneto resistors, magneto diodes, and combinations of hall units, magneto resistors, and magneto diodes. As noted in U.S. Pat. No. 7,038,445, the number of flux lines flowing through the hall detector will be a function of the wall thickness of the material being monitored. Therefore, this monitoring device of the hall units spaced within the inside circumference of a magnetic coil provides the means of measuring the wall thickness of the pipe or OCTG. In certain embodiments, an "or" circuit may be interconnected with each group of magnetic fluctuation detectors so that the largest signal generated from a group of hall units may be determined. In certain embodiments, a defect monitor may be interconnected with each group of the magnetic fluctuation detectors to identify defective hall units.

The term "pipe," as used herein, includes any pipe, hose, tube, pole, shaft, cylinder, duct, rod, oil field tubular, tubing for the flow of oil or gas, casing, drill pipe, oil field tubulars and equivalents thereof made in whole or part of a ferromagnetic material. The term "flaw" as used herein includes any defects, discontinuities or irregularities in the walls or on the surface of the pipe, for example, seams, cracks, chips, and unusual wear.

The term "magnetic field fluctuation detector," used herein, includes hall units, magneto diodes and magneto resistors. In certain embodiments the magnetic fluctuation detector utilized with apparatus, systems, and method embodiments described herein is a hall unit. The term "hall unit," as used herein, includes any Hall detector, and any device or detector which produces a voltage in relation to a magnetic field applied to the detector. Although well known, a brief description of the hall detector is provided. A Hall detector is generally manufactured as a four terminal solid state device which produces an output voltage proportional to the product of an input current, a magnetic flux density and the sine of the angle between magnetic flux density and the plane of the hall detector. A Hall detector typically has an active element and two pairs of ohmic contacts. An electric current flows between two contacts aligned in one direction x. This current, the magnitude and direction of which are known from a calibration stage, in the presence of a perpendicular magnetic field, generates a respective Hall voltage in the other two contacts aligned in a transverse direction y. As known, a Hall detector is sensitive to that component of the magnetic field which is perpendicular to its surface. More specifically, the Hall voltage is responsive to the current flow and to the strength of a magnetic field provided within the vicinity of the Hall detector.

The terms "magnetic field generator" and "magnetic coil" as used herein, include any device capable of generating a horizontal, vertical, or other directional magnetic field of flux. Preferably the magnetic field generator is a coil such an encircling coil or circular coil with multi-turns of wire located in the cavities of the coil.

Eddy current inspection, as explained in U.S. Pat. No. 5,142,230, is a non-destructive procedure used to detect flaws and stress corrosion in electrically conductive materials. This method involves placing an eddy current probe, comprising a coil, near the electrically conductive material. The coil sets up a magnetic field and induces eddy currents in the material. Defects in the material alter the eddy current flow and change the impedance of the coil. As a result, flaws and stress corrosion may be detected by moving the eddy current probe along the material and detecting changes of impedance of the coil.

In certain embodiments, one or more substantially frictionless members may be employed in the detector shoes to maintain the first or "standoff" distance. In certain embodiments the one or more substantially frictionless members may comprises one or more members selected from precision metal rollers, metal ball bearings, plastic rollers, ceramic balls, and non-rotating spacers in ball or roller shape. In certain embodiments, the telescoping supports and iris rotatable element may be actuated by an actuator selected from pneumatic, hydraulic, and electronic actuators. In certain embodiments the detector assemblies may each support a transverse magnetic detector and a wall thickness detector. The detectors may be selected from Hall elements, magneto diodes, and magneto resistors.

The primary features of the apparatus, systems, and methods of the present disclosure will now be described with reference to the drawing figures, after which some of the construction and operational details, some of which are optional, will be further explained. The same reference numerals are used throughout to denote the same items in the figures. In certain embodiments, the variations in the magnetic field detected by magnetic flux detectors and the variations in eddy current detected by eddy current detectors are provided by spacing the detectors so that their respective magnetic or electric fields abut and provide a minimum of 100 percent inspection of the tubular member.

Referring now to FIG. 1, certain embodiments, such as embodiment 100 illustrated schematically in FIG. 1, may comprise a frame 2, a magnetic flux generator (coil) 4 in a coil annulus 8, and a detector assembly 6 supported by frame 2. Coil annulus 8 and detector assembly 6 each have an inlet opening 10 and an outlet opening 12 for accepting a tubular member 14 therein for EMI inspection thereof. Detector assembly 6 includes one or more magnetic flux or eddy current detectors 16 encapsulated in plastic detector shoes 18, the lower surface thereof adapted to be spaced a first distance from the outer surface of tubular member 14.

Optionally, detector shoes 18 may be supported by, and spaced the first distance from the outer surface of tubular 14 by one or more substantially frictionless members during an inspection, as taught in assignee's U.S. Pat. No. 7,397,238.

Still referring to FIG. 1, embodiment 100 further comprises detector shoe supports 20, 21, which in this particular embodiment are telescoping supports, each of which is attached to an inner surface 28 of coil annulus 8 such as by welding, brazing, bolting, or other attachment method or mechanism, or formed integrally with coil annulus 8. Detector shoe support 20 has a rectangular cross-section, while detector shoe support 21 has a circular cross-section. The cross-sectional shape may be the same or different for each detector shoe support, and they may have other cross-sectional shapes, such as triangular, oval, and the like. Adjustable telescoping tubes typically include spring button locking pins or single end snap buttons, and may be easily found on the Internet, such as at the website of W.W. Grainger, Inc. As indicated by the double-headed arrows in FIG. 1 proximate to telescoping detector shoe supports 20, 21, telescoping detector shoe supports 20, 21 allow detector shoes 18 to be moved inward and outward as desired, conveniently allowing EMI inspection of different OD tubulars 14. In certain embodiments, tubular wall thickness (t) may also be investigated. A further feature of embodiment 100 is provision of quick-acting (Q-A) couplings 22, explained more fully herein, that allow detector shoes 18 to be removably installed and removed. For example, one or more detector shoes 18 for a 4-inch OD pipe may be used to inspect one or more of such tubulars, then the process stopped momentarily, for example by stopping a set of pinch rollers 30. While the process is stopped, the first set of detector shoes are removed and another set of detector shoes are installed to inspect larger or smaller tubulars.

In embodiment 100, as in other embodiment described herein, magnetic flux generator 4 is typically a coil of wire, but this is not strictly necessary, as any magnetic flux generator may be used, such as one or more permanent magnets. A combination of one or more coils and one or more permanent magnets may also be employed, although that may add unneeded complexity. Coil 4 is positioned within coil annulus 8. Coil annulus 8 is defined by a generally cylindrical outer wall of diameter d1 and a concentric generally cylindrical inner wall of diameter d2, wherein d1>d2. Generally cylindrical outer wall and generally cylindrical inner wall are each generally parallel to a tubular longitudinal axis (LA). Coil annulus 8 is further defined by front and back end plates connecting the generally cylindrical outer wall and the generally cylindrical inner wall at their peripheral edges.

Figure 2:
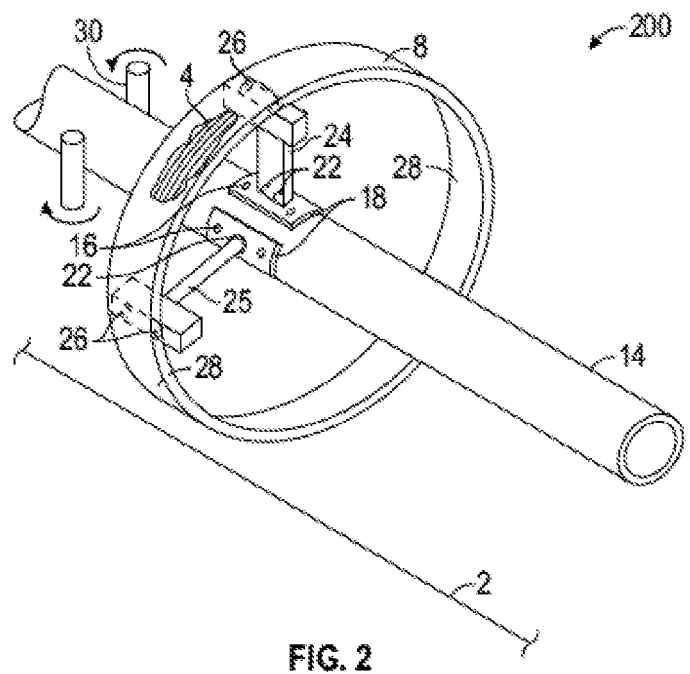

Referring now to FIG. 2, certain embodiments, such as embodiment 200 illustrated schematically in FIG. 2, may comprise a frame 2, a magnetic flux generator (coil) 4 in a coil annulus 8, and a detector assembly 6 supported by frame 2, all as in embodiment 100, including an inlet opening 10 and an outlet opening 12 for accepting a tubular member 14 therein for EMI inspection thereof. Detector assembly 6 includes one or more magnetic flux or eddy current detectors 16 encapsulated in plastic detector shoes 18, the lower surface thereof adapted to be spaced a first distance from the outer surface of tubular member 14. Embodiment 200 differs from embodiment 100 in having non-telescoping detector shoe supports 24, 25, where one of these is illustrated as having a rectangular cross-sectional shape (support 24) and the other is illustrated as having a circular cross-sectional shape (support 25). A further feature of embodiment 200 is provision of Q-A couplings 22, explained more fully herein, that allow detector shoes 18 to be removably installed and removed, as well as a second set of Q-A couplings 26 for removably installing and changing to different length non-telescoping detector shoe supports 24, 25.

Figure 3:
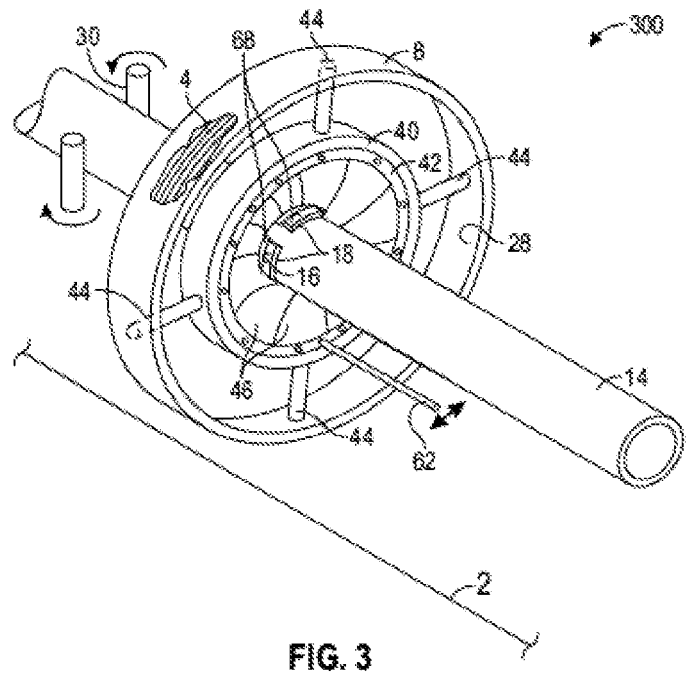

Referring now to FIG. 3, certain embodiments, such as embodiment 300 illustrated schematically in FIG. 3, may comprise a frame 2, a magnetic flux generator (coil) 4 in a coil annulus 8, and a detector assembly 6 supported by frame 2, all as in embodiment 100, including an inlet opening 10 and an outlet opening 12 for accepting a tubular member 14 therein for EMI inspection thereof. Detector assembly 6 includes one or more magnetic flux or eddy current detectors 16 encapsulated in plastic detector shoes 18, the lower surface thereof adapted to be spaced a first distance from the outer surface of tubular member 14.

Figure 3A:
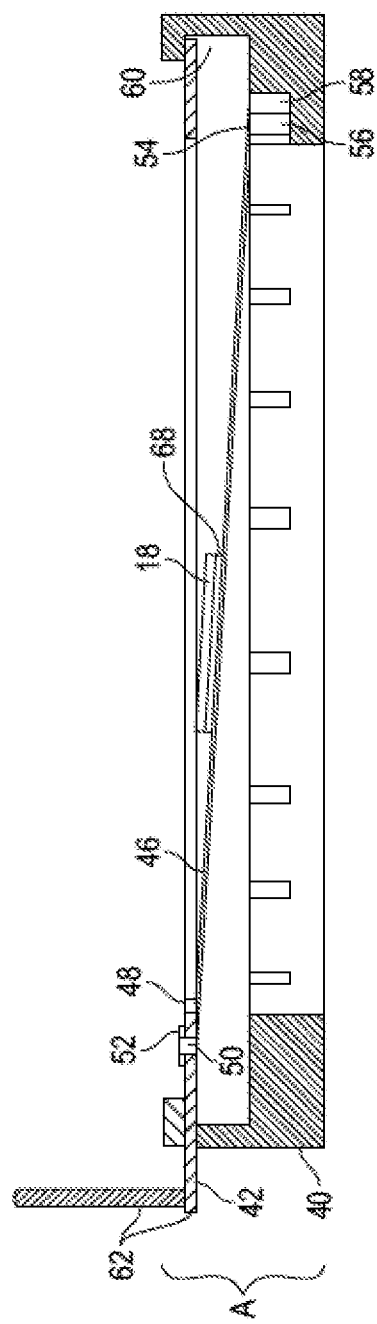
FIG. 3A is a schematic illustration of a cross sectional side view of the iris according to FIG. 3, illustrating schematically one leaf mounted in the iris.

Embodiment 300 differs from embodiments 100 and 200 in having an iris comprising an iris annular base 40 and an annular rotatable element or disc 42, the annular base 40 supported by one or more support brackets 44 connecting annular base 40 with coil annulus 8. As illustrated schematically in FIGS. 3, 3A, 3B, and 3C, the iris comprises a number of leaves 46 (only one leaf is illustrated in FIG. 3A). A first end 48 of leaf 46 is rotatably attached to an opening 50 provided in annular rotatable element 42 by a joint, such as a burst hole joint or other joint 52. A second end 54 of leaf 46 is provided with a pin 56 which is positioned in a slide 58, which is provided in base 40. Brackets 68 allow addition of detector shoes 18 to the iris leaves 46. Although two sets of brackets and detector shoes are illustrated, more may be added. Alternatively, in certain embodiments, detector shoes 18 may attach directly to leaves 46, such as by molding them integrally with the leaves, or by interference fittings.

Figure 3B:
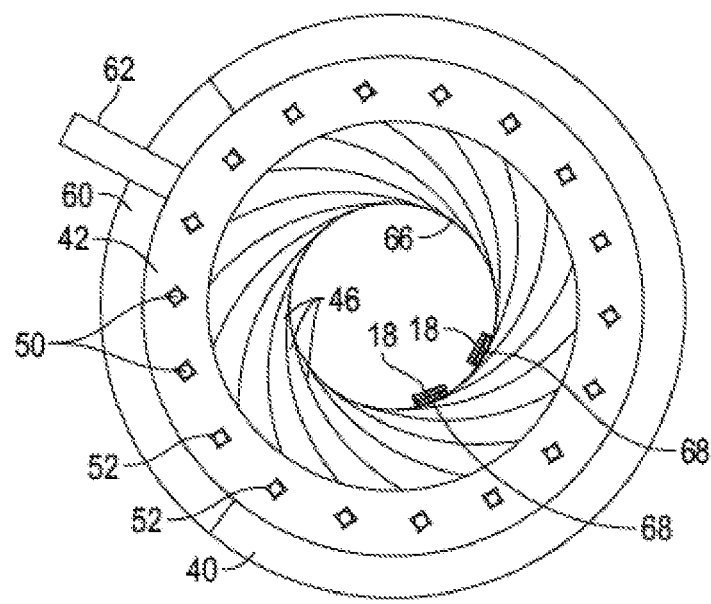
FIG. 3B is a schematic sectional plan view of the iris as illustrated schematically in FIG. 3; and, FIG. 3C is a further schematic sectional plan view of the iris illustrated schematically in FIG. 3.
Figure 3C:
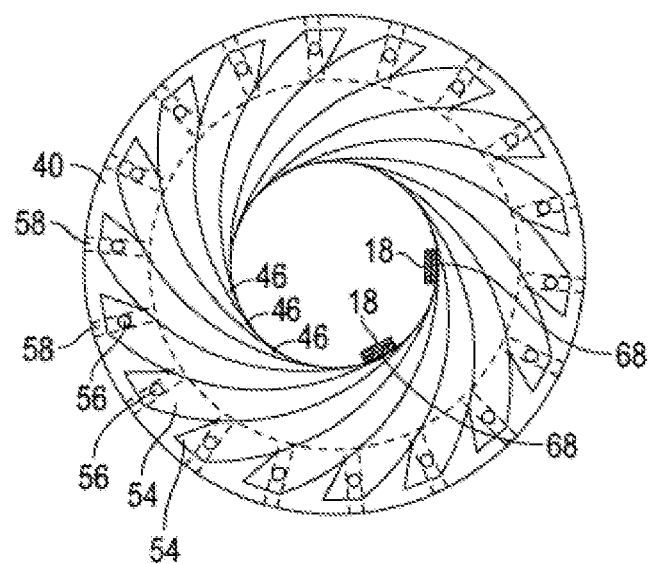

As illustrated schematically in FIG. 3B, disc 42 is provided with apertures 50, one for each of the joints 52 on each of overlapping leaves 46. Accordingly, as illustrated in FIG. 3C, base 40 (the outline of which is shown in broken lines) is provided with slides 58, and each leaf 46 is provided with a pin 56, which is positioned in one slide 58. Disc 42 is positioned in a slot 60 (as illustrated schematically in FIG. 3A) provided in base 40, and it is provided with an operating handle 62, positioned in a further slot 64 (as illustrated schematically in FIG. 3B) provided in base 40. When disc 42 is rotated by handle 62, the first end 48 of each leaf 46 is drawn in a circular direction by joints 52. Joints 52 also rotate on their own axis due to second ends 54 of each leaf 46 being positioned in stationary slides 58. As a result of the above described action, each pin 56 is moved along a respective slide 58. In the movement from fully retracted to fully advanced, each pin 56 moves first towards the center of the iris aperture 66, then back in the opposite direction as joints 52 follow their circular course. Leaves 46 are so shaped that the above described actions result in the iris aperture 66 closing, and the detector shoes 18 moving toward the tubular being inspected. Aperture 66, and this detector shoes 18, may be opened, or placed in any desired position, by the positioning of handle 62. The iris is provided with a narrow width, Distance A, due to the narrow width of joints 52 and pins 56 and slide 58 mechanisms. It will be appreciated that Distance A is restricted only by the capacity to machine pins 56 onto the leaf 46. The width of the iris is determined by size of pins 56 which can effectively be attached to the leaves 46.

In an alternative construction handle 62 may be connected to an operating actuator, for example an electric motor, which may be electronically controlled. The iris mechanism as described may also be used in a dual plane iris of the known type, which may allow addition detector shoes and/or sensors to be utilized. Furthermore, in alternative embodiments, not illustrated, the pivotal arrangements may be reversed and the openings 50 may be provided on annular base 40, and slides 58 may be provided on annular rotatable element 42.

The magnetic detectors and eddy current detectors may each have plastic protective shims or other material between the detectors and the OCTG or pipe being inspected, for protection purposes. This is also well-known in the art and requires no further explanation.

Systems in accordance with the present disclosure may further comprises a tubular conveyor sub-system, as more fully described in assignee's copending U.S. patent No. 11,307,173B1, on which a plurality of tubular members P1, P2, P3 . . . Pn may traverse before and after being inspected at one of the inspection apparatus of the present disclosure. Such systems may comprise one or more actuators adapted to pick up a tubular member being inspected (employing manipulators arms and pipe grippers) and insert tubular member into an inspection apparatus, the one or more actuators selected from the group consisting of pneumatic, hydraulic, and electronic actuators, and combination thereof. In certain embodiments actuator or actuators may be robotic actuators, such as the IRB 7600 industrial robot, available from ABB Asea Brown Boveri Ltd. Simple cranes or other pipe lifting equipment known in the OCTG inspection industry may also be employed. Actuators may be floor mounted, cabinet-mounted, or roof-mounted. In certain embodiments the actuator(s) should have capacity to lift standard lengths of steel pipe.

Quick-Acting Connectors

All quick-acting couplings have some elements in common. All have two parts: a plug and a socket. The plug is the male half and the socket is the female half. When connected properly, these parts lock (and in certain instances seal) the joint effectively to contain internal pressures and resist any tensile forces that tend to pull the joint apart and contain internal pressures if desired. The parts are easily disconnected without tools by disengaging a locking mechanism and separating parts. The more frequently detector shoes must be connected and disconnected, the more valuable quick-acting couplings become. Quick-acting couplings eliminate bottlenecks by slashing time required to change detector shoes to accommodate various tubular ODs. Just a quick push/pull, and in some embodiments, a twist, the detector shoe may be ready to inspect tubulars. In contrast, inspection time would skyrocket if technicians had to tap into systems using fittings and a wrench for each different tubular OD.

Among the many different designs of quick-acting ("Q-A") couplings that may be used for an EMI inspection application, unvalved types have the advantage of lower cost, since they are designed to provide low pressure loss through the coupling (for example if hydraulic fluid or air is used as a control fluid), and make no provision to prevent fluid from escaping once the coupling is disconnected. Since most EMI inspection applications require no fluid, issues of pressure drop and fluid draining from disconnected hoses are not a concern, and unvalved couplings would likely be a designer's first choice. In those embodiments where temperature of a sensor in an inspection shoe is a concern, valved designs may be employed, allowing a heat transfer fluid to pass near or through the inspection shoe. Incorporating a shutoff valve into one or both halves of the coupling allows fluid to flow through the coupling only when both halves are connected. When the coupling is disconnected, a mechanical link between the coupling halves is broken and causes the valve to close, blocking flow. When only one coupling half is valved, it usually is located on the source (upstream) end of the joint. Pneumatic systems generally employ this setup: the valved coupling half prevents air loss from the system while the joint is disconnected, the unvalved coupling half allowed downstream air to bleed off. In hydraulic applications, both coupling halves often are valved. This practice not only minimizes fluid leakage, but also limits the amount of air, dirt, and water that can enter the system. When a coupling is disconnected, air can become trapped between valves and enter the system when the joint is reconnected. Special provisions may be necessary to exclude air. To address these concerns, many manufacturers now offer flat-faced couplings that reduce fluid spillage to a drop or less every time the coupling is disconnected. Furthermore, mating surfaces of each coupling half are flush when the coupling is disconnected. This minimizes air ingression and wiping the mating surfaces clean before reconnecting them.

Some Q-A couplings are designed for fluid handling and may include one or two valves. One drawback to valved couplings include larger size and higher cost. The cost differential will vary according to size and individual design. Generally, couplings designed for low pressure drop, no fluid leakage, and no air entrapment carry a higher price tag.

Figure 4A:
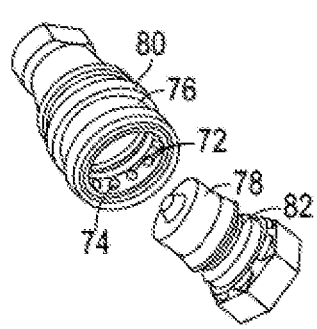
FIGS. 4A, 4B, 4C, 4D, 4E, 4F, 4G, and 4H are schematic perspective illustration views of eight quick-action couplings that may be useful in apparatus, systems, and methods of the present disclosure.

There are over a dozen common designs of quick-acting couplings. FIGS. 4A-H illustrate schematically eight different designs each having its own locking mechanisms. It will be understood that these are only examples and that other designs may work just as well or better. Ball-locks, illustrated schematically in FIG. 4A, are the most common design and has the widest range of applications. A group of balls 72 is positioned in holes 74 located around the ID of a socket body 76. Holes 74 normally are tapered or stepped to reduce their diameter at the socket body ID, so balls 72 do not fall into the cavity vacated by plug 78 when the coupling is disconnected. A spring-loaded sleeve 80 around socket body 76 OD forces balls 72 toward socket body 76 ID. To connect plug 78, sleeve 80 is pushed back, which opens clearance so balls 72 are free to move outward. Once plug 78 is in place, releasing sleeve 80 forces balls 72 inward against a locking groove 82 on OD of plug 78. To disconnect, pushing the sleeve back provides the balls with clearance to move outward and allow the plug to be removed.

Figure 4B:
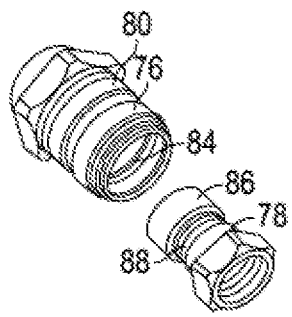

Roller-lock couplings, illustrated schematically in FIG. 4B, use locking rollers or pins spaced end-to-end in grooves or slots 84 around socket 76 ID. As plug 78 is inserted, a ramp 86 on plug 78 OD pushes the rollers outward. Once plug ramp 86 is inserted the prescribed distance, the rollers slip into a retention groove 88 on plug 78 OD. Retracting locking sleeve 80, which allows ramp 86 on plug 78 OD to move the rollers outward, releases plug 78.

Figure 4C:
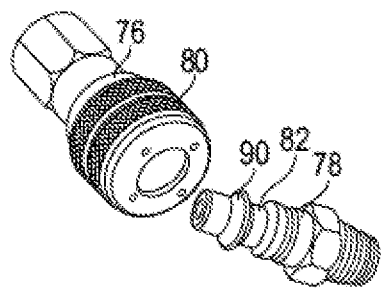

Pin-lock couplings, illustrated schematically in FIG. 4C, allow push-to-connect joining using only one hand because outer sleeve 80 does not need to be retracted to make a connection. In this design, pins are mounted around socket body 76 ID in a truncated-cone-shaped formation. Pushing plug 78 into socket body 76 moves pins back and outward, due to a ramp 90 on plug 78. Shear across pins locks plug 78 into socket body 76. Retracting springloaded sleeve 80, which forces the pins back out of locking groove 92, releases plug 78 from socket body 76.

Figure 4D:
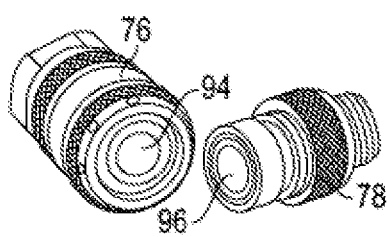

Flat-face, no-spill couplings, illustrated schematically in FIG. 4D, have a poppet-style shutoff valve 94, 96 on each mating half. Most limit leakage during uncoupling to only a film of oil on the coupling's mating surfaces and prevent air ingression during coupling. They are also designed for minimum flow restriction, which minimizes pressure drop during equipment operation.

Figure 4E:
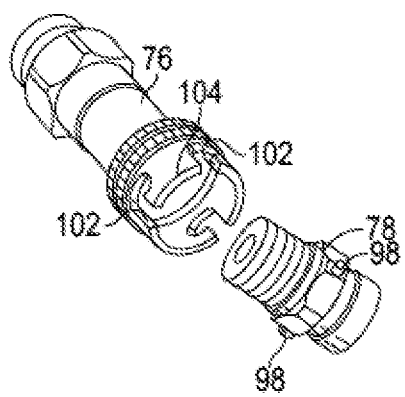

Bayonet couplings, illustrated schematically in FIG. 4E, rely on the familiar twist locking arrangement and are widely used in a variety of applications, especially in plastic couplings for lighter-duty pneumatic equipment. To join the socket body 76 and plug 78, lugs 98 on the OD of plug 78 engage slots 102 in a socket sleeve 104 as plug 78 is pushed into socket sleeve 104. A quick turn locks lugs 98 into position. Turning plug 78 in the opposite direction allows socket body 76 and plug 78 to be pulled apart.

Figure 4F:
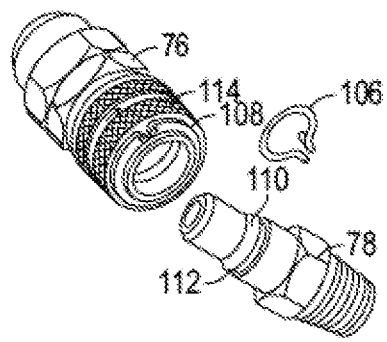

Ring-lock couplings, illustrated schematically in FIG. 4F, use a split ring 106 seated in a groove and slot 108 in socket body 76. Pushing plug 78 into position causes a ramp 110 on plug 78 to spread split ring 106 apart at the split until split ring 106 snaps closed behind a retention shoulder 112 on plug 78. Rotating an external sleeve 114 expands split ring 106, thus releasing it from retention shoulder 112 so socket body 76 and plug 78 can be pulled apart. A variation of this design uses jaws instead of a split ring to lock the parts together.

Figure 4G:
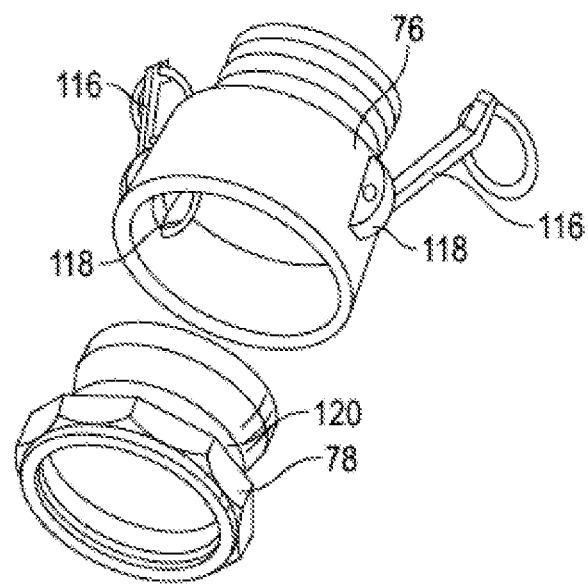

Cam-lock couplings, illustrated schematically in FIG. 4G, use a pair of external levers 116 and cams 118 that fit in a locking groove 120 to lock socket body 76 to plug 78 when external levers 116 are folded back against the sides of socket body 76. These are most common in larger sizes and generally require more spaces than comparable couplings of the same size. Moreover, the locking mechanism can wear if lines are connected or disconnected frequently, which can allow leakage.

Figure 4H:
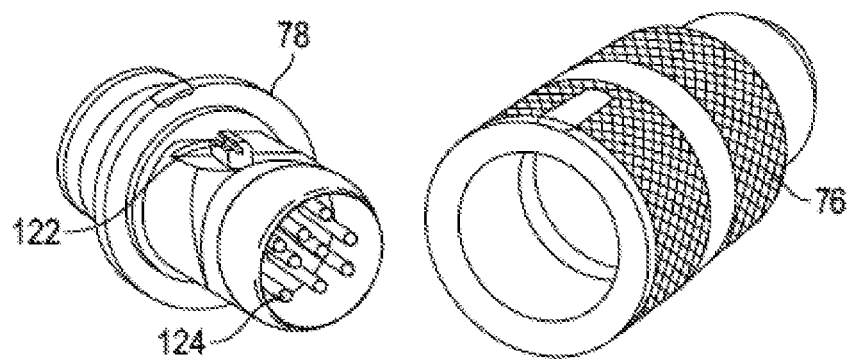
Figure 5:
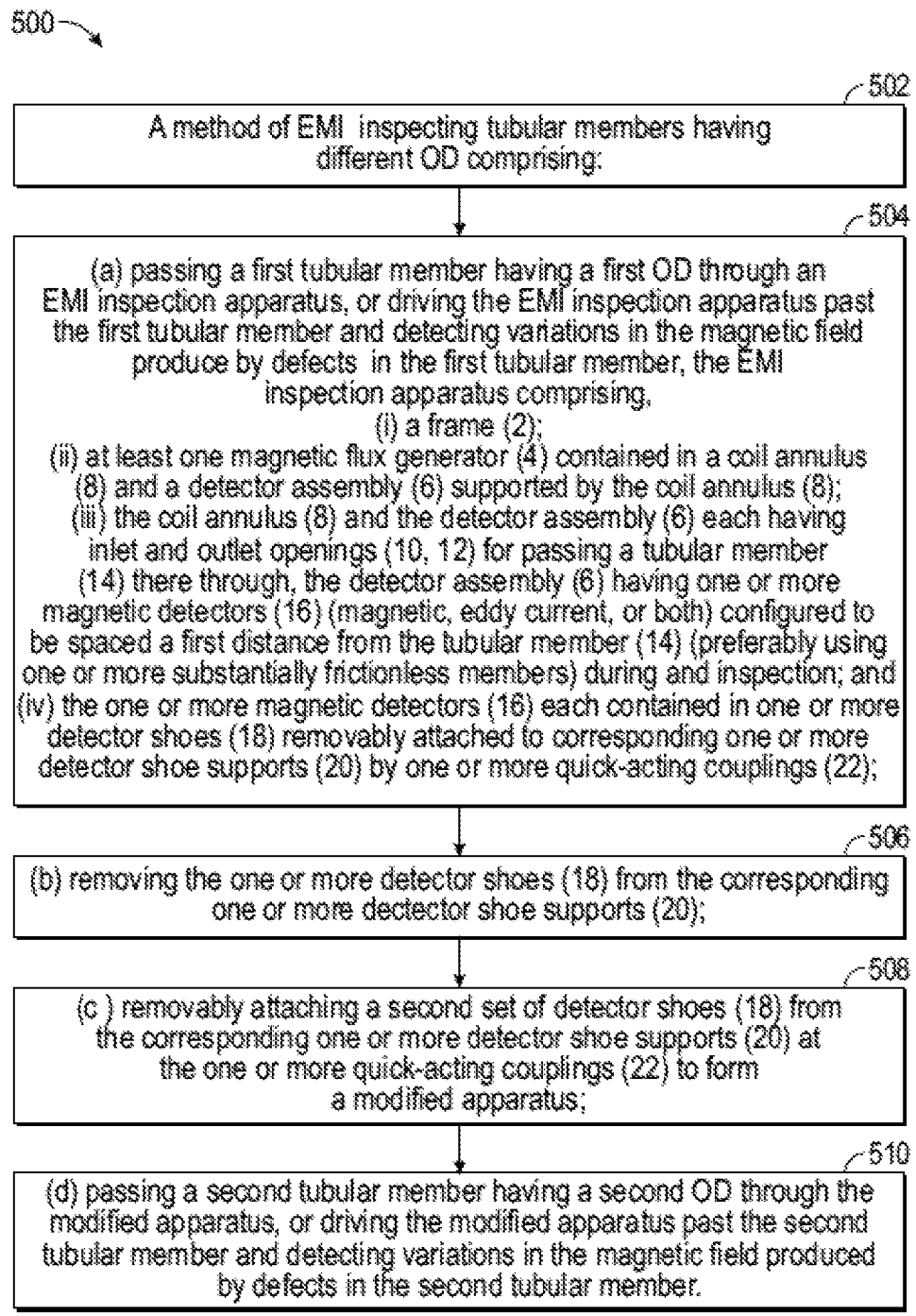
Figure 6:
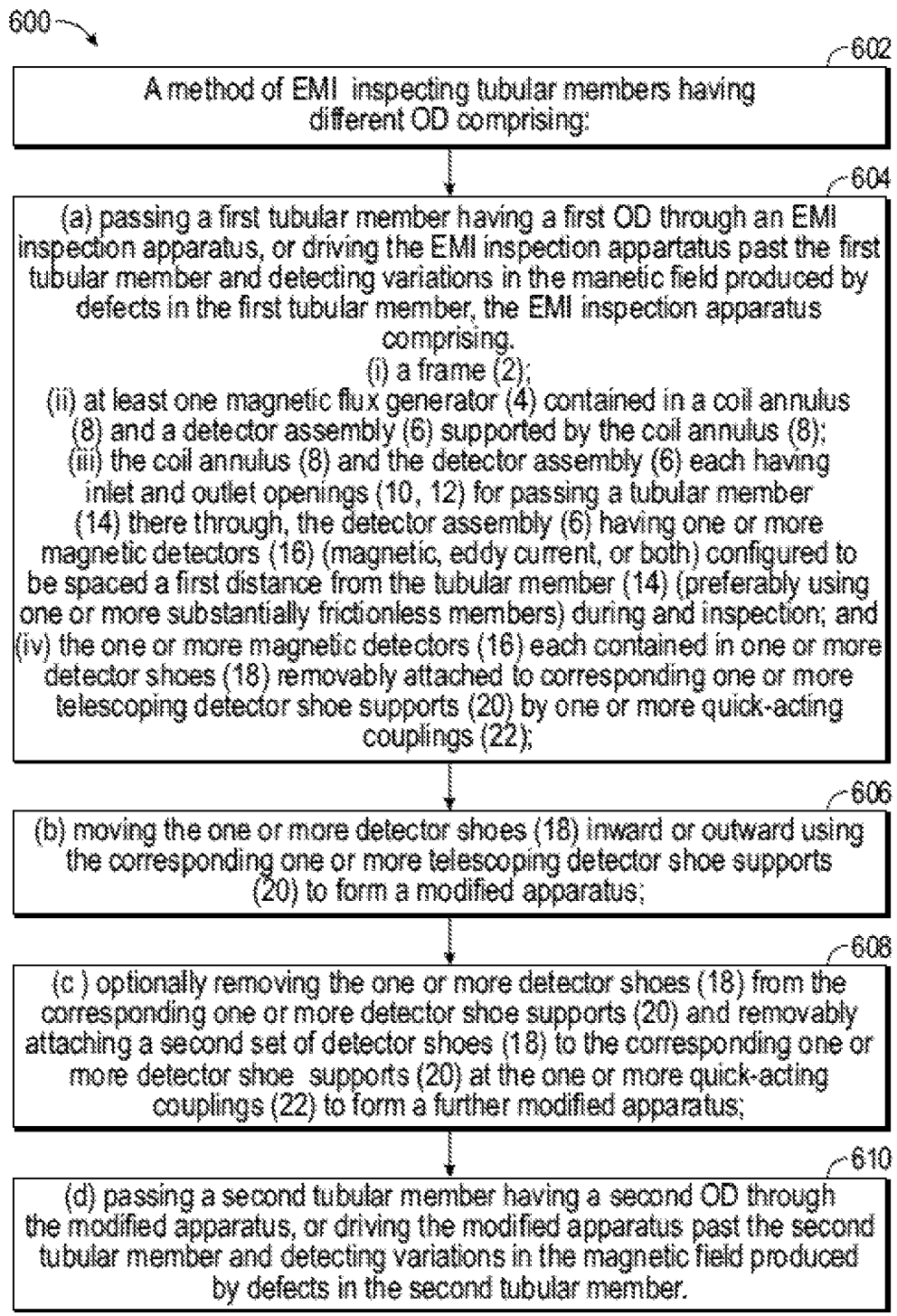
Figure 7:
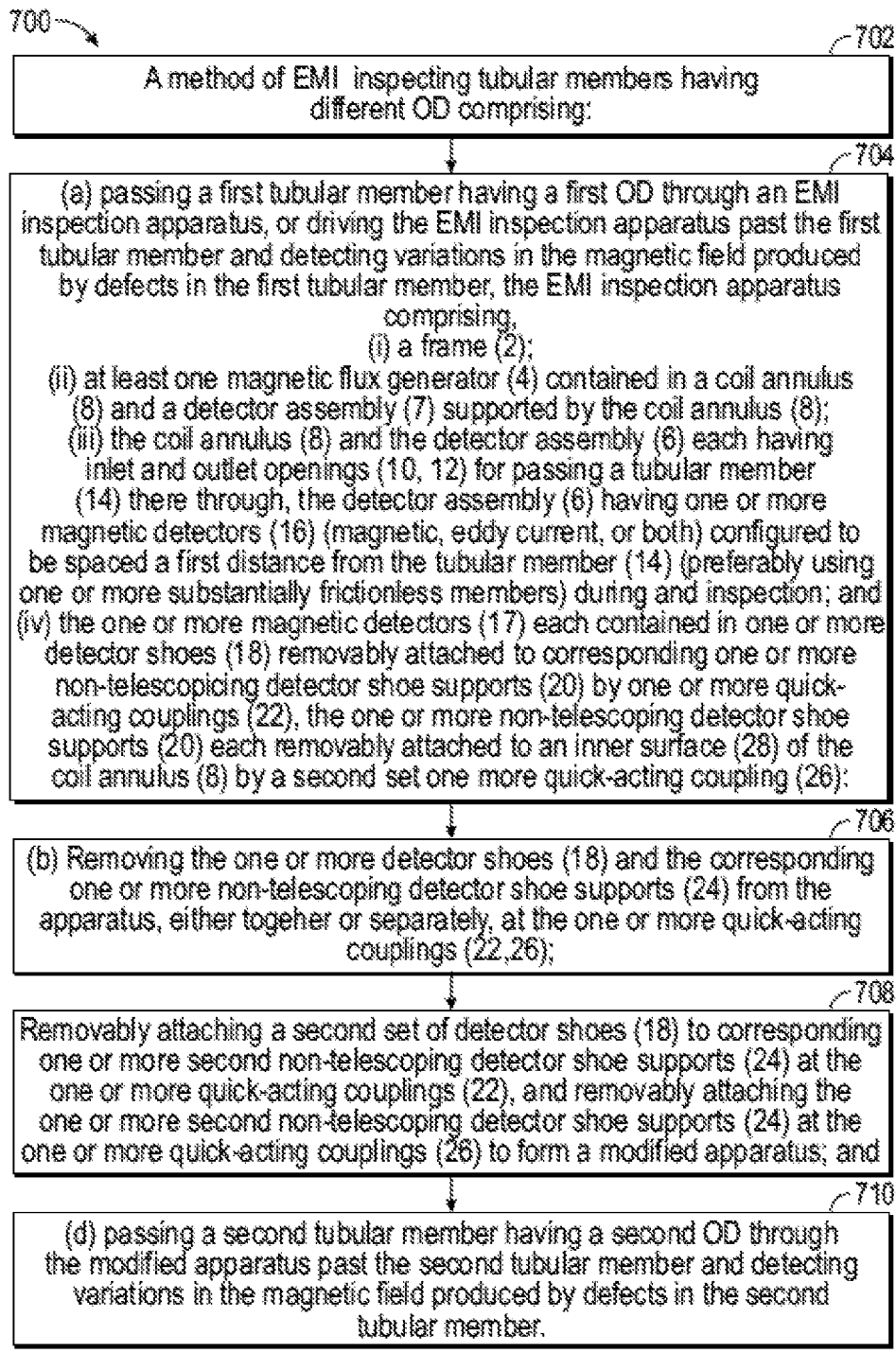

Cannon-style connectors, illustrated schematically in FIG. 4H, such as that known under the trade designation MKJ4 Breakaway from ITT Corporation, features a canted retention spring disconnect coupling mechanism. This durable coupling mechanism allows for quick and easy mating and de-mating. A spring-loaded button 122 when depressed allows plug 78 to be removed from socket body 78. Multiple pins 124 in plug 78 mate with corresponding openings internal of socket body 76 when plug 78 is inserted therein, and button 122 mates with a slot on the ID of socket body 76.

The choice of a particular material for the Q-A couplings is dictated among other parameters by the vibration and degree of expected twisting motion of the inspection shoes expected during use of EMI inspection apparatus, temperature, an expected humidity and other environmental conditions. The skilled artisan, having knowledge of the particular application, environmental conditions, and available materials, will be able design the most cost effective, safe, and operable EMI inspection apparatus for each particular application without undue experimentation. Before selecting a Q-A coupling, questions must be answered regarding its expected performance, including how often the coupling will be connected and disconnected, will the coupling be subjected to abuse such as impact from falling objects, severe vibration, or contamination from the environment. Once these questions have been answered, a preliminary selection of coupling type can be made regarding the type of connect/disconnect mechanism, keeping in mind that one style may offer the greatest convenience in service, but a different model may be more desirable for the application.

Materials of construction are another consideration. A wide variety of O-ring and seal materials—elastomers, PTFE, and the like—are available to accommodate a wide range of temperatures. Material chosen for the plug and socket also is important. Carbon steel, stainless steel, brass, and aluminum are common. In addition, many parts are made from carbon steel and plated with a corrosion-resistant metal to keep material costs down. Plastic may be used for many applications if expected vibration, temperature, and environment permit. Keep in mind that plastic couplings may contain internal metal components that could corrode over time. Pressure rating of the Q-A coupling is not a concern in most embodiments. However, depending on the particular EMI inspection process, the coupling may be subjected to vibration or relative rotation between the mating halves, for example if a defect or dirt on the tubular causes the inspection shoe to twist or turn. These conditions may shorten the expected life of the Q-A coupling by causing difficulties in connecting or disconnecting. The manufacturer of the coupling may need to be consulted to determine if the coupling will tolerate these conditions. The various designs of quick-acting couplings available differ primarily in how the two halves connect to each other. Several designs are fairly standard and may be interchangeable from one manufacturer to another. These standardized couplings are based on designs for which patents expired year ago. Still, some manufacturers warn against interchanging standard designs between manufacturer because the loose tolerances of one product line may cause problems if it is mated with another product requiring tighter tolerances. The couplings may match based on nominal size but they may not mate or operate properly together.

FIGS. 5, 6, 7, and 8 are logic diagrams of four method embodiments 500, 600, 700, and 800 of inspecting pipe or other OCTG in accordance with the present disclosure. Method embodiment 500 of inspecting a tubular comprises (box 502): passing a first tubular member having a first OD through an EMI inspection apparatus, or driving the EMI inspection apparatus past the first tubular member and detecting variations in the magnetic field produced by defects in the first tubular member, the EMI inspection apparatus comprising (i) a frame (2); (ii) at least one magnetic flux generator (4) contained in a coil annulus (8) and a detector assembly (6) supported by the coil annulus (8); (iii) the coil annulus (8) and the detector assembly (6) each having inlet and outlet openings (10, 12) for passing a tubular member (14) there through, the detector assembly (6) having one or more magnetic detectors (16) (magnetic, eddy current, or both) configured to be spaced a first distance from the tubular member (14) (preferably using one or more substantially frictionless members) during an inspection; and (iv) the one or more magnetic detectors (16) each contained in one or more detector shoes (18) removably attached to corresponding one or more detector shoe supports (20) by one or more quick-acting couplings (22) (box 504); (b) removing the one or more detector shoes (18) from the corresponding one or more detector shoe supports (20) (box 506); (c) removably attaching a second set of detector shoes (18) to the corresponding one or more detector shoe supports (20) at the one or more quick-acting couplings (22) to form a modified apparatus (box 508); and (d) passing a second tubular member having a second OD through the modified apparatus, or driving the modified apparatus past the second tubular member and detecting variations in the magnetic field produced by defects in the second tubular member (box 510).

Method embodiment 600 of inspecting a tubular comprises (box 602): (a) passing a first tubular member having a first OD through an EMI inspection apparatus, or driving the EMI inspection apparatus past the first tubular member and detecting variations in the magnetic field produced by defects in the first tubular member, the EMI inspection apparatus comprising (i) a frame (2); (ii) at least one magnetic flux generator (4) contained in a coil annulus (8) and a detector assembly (6) supported by the coil annulus (8); (iii) the coil annulus (8) and the detector assembly (6) each having inlet and outlet openings (10, 12) for passing a tubular member (14) there through, the detector assembly (6) having one or more magnetic detectors (16) (magnetic, eddy current, or both) configured to be spaced a first distance from the tubular member (14) (preferably using one or more substantially frictionless members) during an inspection; and (iv) the one or more magnetic detectors (16) each contained in one or more detector shoes (18) removably attached to corresponding one or more telescoping detector shoe supports (20) by one or more quick-acting couplings (22) (box 604); (b) moving the one or more detector shoes (18) inward or outward using the corresponding one or more telescoping detector shoe supports (20) to form a modified apparatus (box 606); (c) optionally removing the one or more detector shoes (18) from the corresponding one or more detector shoe supports (20) and removably attaching a second set of detector shoes (18) to the corresponding one or more detector shoe supports (20) at the one or more quick-acting couplings (22) to form a further modified apparatus (box 608); and (d) passing a second tubular member having a second OD through the modified apparatus, or driving the modified apparatus past the second tubular member and detecting variations in the magnetic field produced by defects in the second tubular member (box 610).

Method embodiment 700 of inspecting a tubular comprises (702): (a) passing a first tubular member having a first OD through an EMI apparatus, or driving the EMI apparatus past the first tubular member and detecting variations in the magnetic field produced by defects in the first tubular member, the EMI apparatus comprising (i) a frame (2); (ii) at least one magnetic flux generator (4) contained in a coil annulus (8) and a detector assembly (6) supported by the coil annulus (8); (iii) the coil annulus (8) and the detector assembly (6) each having inlet and outlet openings (10, 12) for passing a tubular member (14) there through, the detector assembly (6) having one or more magnetic detectors (16) (magnetic, eddy current, or both) configured to be spaced a first distance from the tubular member (14) (preferably using one or more substantially frictionless members) during an inspection; and (iv) the one or more magnetic detectors (16) each contained in one or more detector shoes (18) removably attached to corresponding one or more non-telescoping detector shoe supports (20) by a first set of one or more quick-acting couplings (22), the one or more non-telescoping detector shoe supports (20) each removably attached to an inner surface (28) of the coil annulus (8) by a second set of one or more quick-acting couplings (26) (box 704); (b) removing the one or more detector shoes (18) and the corresponding one or more non-telescoping detector shoe supports (24) from the apparatus, either together or separately, at the one or more quick-acting couplings (22, 26) (box 706); (c) removably attaching a second set of detector shoes (18) to corresponding one or more second non-telescoping detector shoe supports (24) at the one or more quick-acting couplings (22), and removably attaching the one or more second non-telescoping detector shoe supports (24) at the one or more quick-acting couplings (26) to form a modified apparatus (box 708); and (d) passing a second tubular member having a second OD through the modified apparatus, or driving the modified apparatus past the second tubular member and detecting variations in the magnetic field produced by defects in the second tubular member (box 710).

Method embodiment 800 of inspecting a tubular comprises (802): (a) passing a first tubular member having a first OD through an EMI inspection apparatus, or driving the EMI inspection apparatus past the first tubular member and detecting variations in the magnetic field produced by defects in the first tubular member, the EMI inspection apparatus comprising (i) a frame (2); (ii) at least one magnetic flux generator (4) contained in a coil annulus (8) and a detector assembly (6) supported by an iris, the iris comprising an annular base (40), an annular rotatable element (42), and a plurality of leaves (46), the annular base (40) supported by the coil annulus (8) via one or more support brackets (44); (iii) the coil annulus (8), the detector assembly (6), and the iris each having inlet and outlet openings (10, 12) for passing a tubular member (14) there through, the detector assembly (6) having one or more magnetic detectors (16) (magnetic, eddy current, or both) configured to be spaced a first distance from the tubular member (14) (preferably using one or more substantially frictionless members) during an inspection; and (iv) the one or more magnetic detectors (16) each contained in one or more detector shoes (18) removably attached to one or more iris leaves (46) by shoe brackets (68) (box 804); (b) adjusting the iris to accommodate a second tubular member having a second OD different from the first OD to form a modified apparatus (box 806); and (c) passing the second tubular member having the second OD through the modified apparatus, or driving the modified apparatus past the second tubular member and detecting variations in the magnetic field produced by defects in the second tubular member (box 808).

An on-board power unit may be included in certain system embodiments for powering the magnetic flux generator(s), which may be a permanent or rechargeable battery pack or transformer for electrical power, or both. An on-board electronics package may include one or more microprocessors, a communications link (wired or wireless), and/or an on-board controller. A CRT, LED or other human-machine interface may be included on or in a workstation cabinet in certain embodiments.

Magnetic flux generator(s) 4, detector shoes 18, and pinch rollers 30 may, in certain embodiments, be powered from within via an instrument display or other human/machine interface (HMI), for example using batteries, Li-ion or other type. In other embodiments display/HMI may be powered from an instrument cable providing power, perhaps by a local generator, or grid power. The display/HMI allows an operator to interface with the instrument. In certain embodiments the operator will be able to take measurements, view or read these measurements and reset the instrument for subsequent measurement taking. If the display/HMI is connected to a power cable, then measurements may be taken remotely, stored and reset as necessary.

In certain embodiments power would be supplied at a voltage and current that enables the systems to be intrinsically safe. By "intrinsically safe" is meant the definition of intrinsic safety used in the relevant IEC apparatus standard IEC 60079-11, defined as a type of protection based on the restriction of electrical energy within apparatus and of interconnecting wiring exposed to the potentially explosive atmosphere to a length below that which can cause ignition by either sparking or heating effects. For more discussion, see "AN9003—A User's Guide to Intrinsic Safety", retrieved from the Internet Jul. 12, 2017, and incorporated herein by reference.

What has not been recognized or realized are apparatus, systems, and methods to inspect OCTG, especially with a combination of magnetic flux detectors and eddy current detectors, or only with magnetic flux detectors, for different size tubular OD, or a single tubular with varying OD. Apparatus, systems, and methods to accomplish this quickly to increase pipe production without significant risk to workers is highly desirable.

In will be apparent that in other embodiments, the various components need not have the shapes illustrated in the various drawing figures, but rather could take any shape. For example, the coil annulus could have a box or cube shape, elliptical, triangular, pyramidal (for example, three or four sided), prism-shaped, hemispherical or semi-hemispherical-shaped (dome-shaped), or combination thereof and the like, as long as the apparatus is capable of generating the required magnetic flux to inspect the OCTG or other tubulars. It will be understood that such embodiments are part of this disclosure and deemed with in the claims. Furthermore, one or more of the various components may be ornamented with various ornamentation produced in various ways (for example stamping or engraving, or raised features such as reflectors, reflective tape, and the like), oil tool designs, logos, letters, words, nicknames (for example BIG JAKE, and the like). Hand holds may be machined or formed to have easy-to-grasp features for fingers, or may have rubber grips shaped and adorned with ornamental features, such as raised knobby gripper patterns.

Thus the apparatus, systems, and methods described herein provide a quick and safe way of inspecting OCTG of different OD accurately and repeatably.

From the foregoing detailed description of specific embodiments, it should be apparent that patentable apparatus, systems, and methods have been described. Although specific embodiments of the disclosure have been described herein in some detail, this has been done solely for the purposes of describing various features and aspects of the apparatus, systems, and methods, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification of embodiments 100 and 200 would be to provide rotation of the inspection unit rather than, or along with, rotation of the OCTG. Such embodiments are considered with the present disclosure.

What is claimed is:

1. A tubular member electromagnetic inspection (EMI) apparatus comprising:
   (a) a frame (2);
   (b) at least one magnetic flux generator (4) contained in a coil annulus (8) and a detector assembly (6) supported by the coil annulus (8);
   (c) the coil annulus (8) and the detector assembly (6) each having inlet and outlet openings (10, 12) for passing a tubular member (14) there through, the detector assembly (6) having one or more magnetic detectors (16) (magnetic, eddy current, or both) configured to be spaced a first distance from the tubular member (14) during an inspection; and
   (d) the one or more magnetic detectors (16) each contained in one or more detector shoes (18) removably attached to corresponding one or more detector shoe supports (20) by one or more two-part quick-acting couplings (22), the one or more detector shoe supports (20) each comprise a non-telescoping member (24) of length selected corresponding to diameter of the tubular to be EMI inspected, each non-telescoping member

(24) removably attached to an inner surface (28) of the coil annulus (8) by one or more two-part quick-acting couplings (26).

2. The EMI apparatus of claim 1 wherein the one or more two-part quick-acting couplings (22) are selected from the group consisting of ball-lock couplings, roller-lock couplings, pin-lock couplings, flat-faced couplings, bayonet couplings, cam-lock couplings, multi-tube connectors, and combinations thereof.

3. The EMI apparatus of claim 1 configured to operate continuously.

4. The EMI apparatus of claim 1 configured to inspect plain-end oil country tubular goods (OCTG) materials having an outer diameter ranging from about 2⅜ inches (about 60.3 mm) to about 8.00 inches (about 203.2 mm).

5. The EMI apparatus of claim 1 configured to inspect plain-end oil country tubular goods (OCTG) materials having an outer diameter ranging from about 4½ inches (114.3 mm) to about 14.00 inches (355.6 mm).

6. The EMI apparatus of claim 1 configured to perform EMI inspection methods including magnetic flux leakage technology for outside diameter (OD) and inside diameter (ID) longitudinal and transverse flaws, magnetic flux density for 100% coverage of the wall thickness variations, and an eddy current system for comparison of metallurgical mass and permeability differences.

7. The EMI apparatus of claim 1 wherein the detector assembly comprises one or more electromagnet acoustic transducer (EMAT) sensors.

8. The EMI apparatus of claim 1 wherein the first distance is at least 0.030 inch.

9. The EMI apparatus of claim 1 wherein the first distance ranges from about 0.050 inch up to about 0.5 inch.

10. The EMI apparatus of claim 1 wherein the detector assembly comprises a plurality of detector support sub-assemblies.

11. The EMI apparatus of claim 1 wherein the one or more two-part quick-acting couplings (22) comprise spring button locking pins or single end snap buttons.

12. A tubular member electromagnetic inspection (EMI) apparatus comprising:
(a) a frame (2);
(b) at least one magnetic flux generator (4) contained in a coil annulus (8) and a detector assembly (6) supported by the coil annulus (8);
(c) the coil annulus (8) and the detector assembly (6) each having inlet and outlet openings (10, 12) for passing a tubular member (14) there through, the detector assembly (6) having one or more magnetic detectors (16) (magnetic, eddy current, or both) configured to be spaced a first distance from the tubular member (14) during an inspection; and
(d) the one or more magnetic detectors (16) each contained in one or more detector shoes (18) removably attached to corresponding one or more detector shoe supports (20) by one or more two-part quick-acting couplings (22) wherein the frame (2) comprises a steel welded sub-frame supporting one or more pinch roller systems (30), the coil annulus (8) comprises rigid aluminum, and the apparatus is configured to perform a quality EMI inspection of oil country tubular goods (OCTG) pipe with wall thicknesses up to about 0.625 inch (15.9 millimeters), and with production speeds up to about 150 feet per minute (about 46 meters per minute).

13. A method of electromagnetic inspection (EMI) of tubular members having different outside diameter (OD) comprising:
(a) passing a first tubular member having a first OD through the apparatus of claim 1, or driving the apparatus of claim 1 past the first tubular member and detecting variations in the magnetic field produced by defects in the first tubular member;
(b) removing the one or more detector shoes (18) from the corresponding one or more detector shoe supports (20);
(c) removably attaching a second set of detector shoes (18) to the corresponding one or more detector shoe supports (20) at the one or more two-part quick-acting couplings (22) to form a modified apparatus; and
(d) passing a second tubular member having a second OD through the modified apparatus, or driving the modified apparatus past the second tubular member and detecting variations in the magnetic field produced by defects in the second tubular member.

14. The method of claim 13 wherein the variations in the magnetic field are detected by said magnetic detectors spaced so that their respective magnetic fields abut and provide a minimum of 100 percent inspection of the tubular member.

\* \* \* \* \*